United States Patent [19]

Acosta

[11] Patent Number: 4,927,317
[45] Date of Patent: May 22, 1990

[54] APPARATUS FOR TEMPORARILY COVERING A LARGE LAND AREA

[75] Inventor: Wilfred J. Acosta, Violet, La.

[73] Assignee: Waste Management, Inc., Oak Brook, Ill.

[21] Appl. No.: 239,294

[22] Filed: Sep. 1, 1988

[51] Int. Cl.⁵ .............................................. E02F 5/00
[52] U.S. Cl. .................................. 414/724; 212/259; 405/270; 414/912
[58] Field of Search ....... 414/724, 607, 11, DIG. 912; 212/259; 37/DIG. 3; 47/9; 405/270, 288

[56] References Cited

U.S. PATENT DOCUMENTS 2,558,388  6/1951  Richardson ........................ 414/607
3,921,837  11/1975  Vandewater .................... 414/912 X

FOREIGN PATENT DOCUMENTS 479165  12/1951  Canada .................................. 414/11

Primary Examiner—Robert J. Spar
Assistant Examiner—Donald W. Underwood
Attorney, Agent, or Firm—Fitch, Even, Tabin & Flannery

[57] ABSTRACT

A method for temporarily covering a large land area and an apparatus for suspending a flexible cover from a front loader bucket of an earth-moving vehicle. One example of the apparatus includes a cross member having a mid-portion connected by extension arms to the bucket. Tubular enclosures on the bucket receive the free ends of the extension arms for cantilever support thereof. The method of covering the land area includes releasably attaching opposed ends of the flexible cover to the cross member and moving the vehicle to a first location of the land area. The bucket is lowered and a first end of the cover is released. The bucket is raised and the vehicle is moved to a second location so as to spread the cover over increasingly larger portions of the land area. The second end of the cover is thereafter released so that the cover is laid out over the land area. The steps of the method are reversed to remove the cover from the land area. The method and apparatus have particular application for use with sanitary landfill sites.

12 Claims, 7 Drawing Sheets

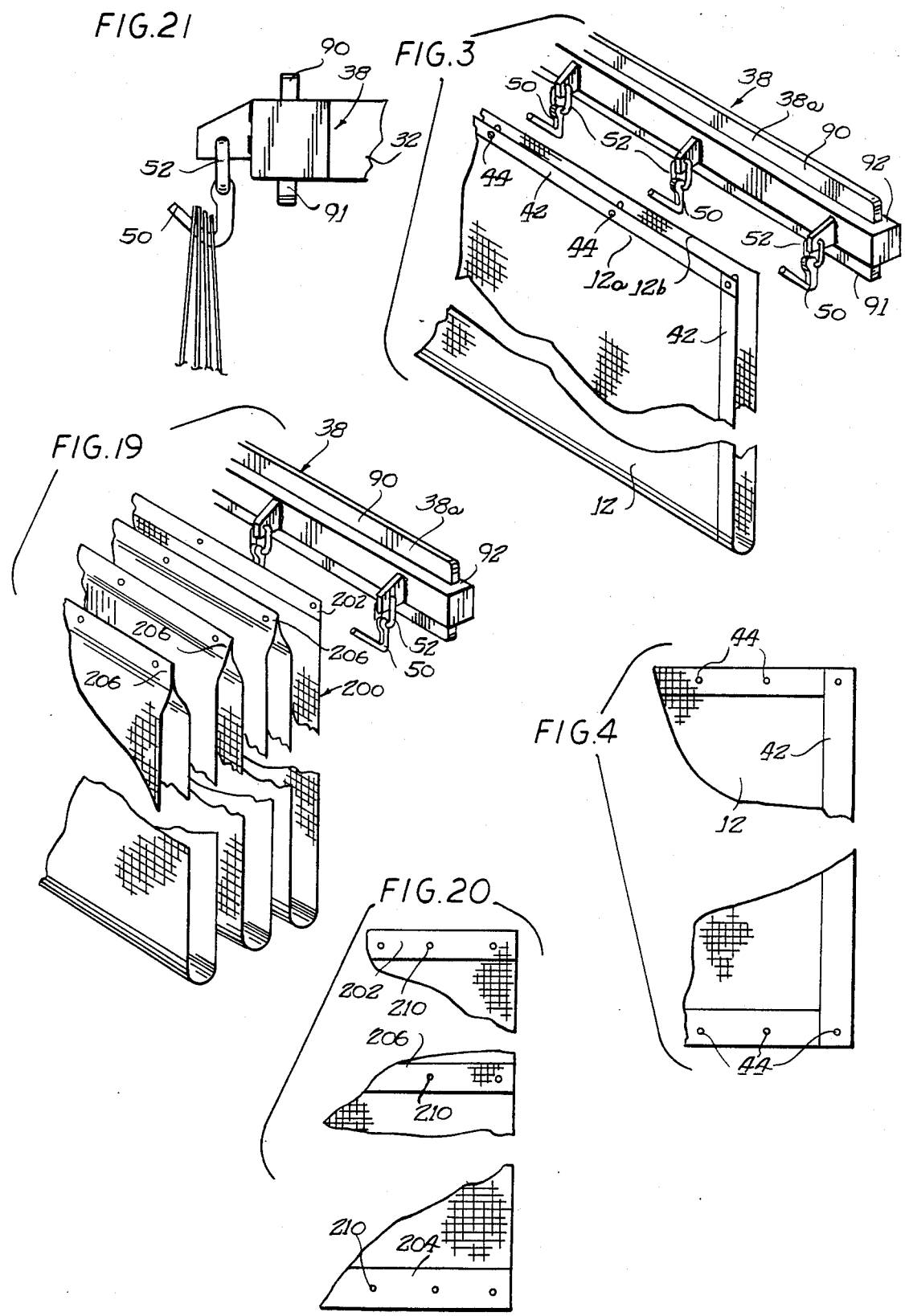

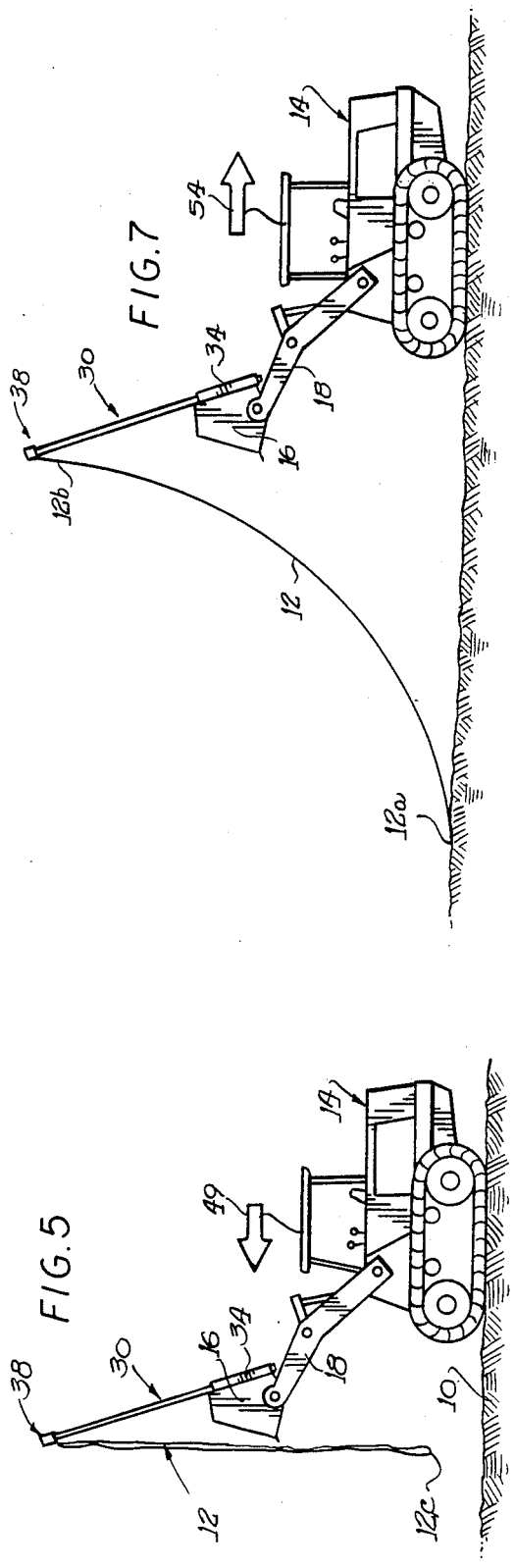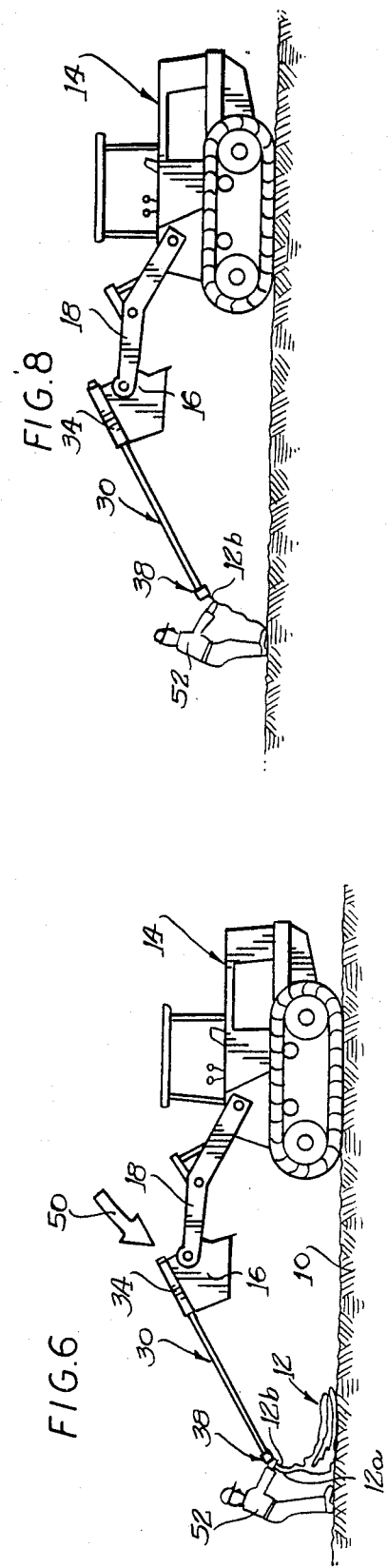

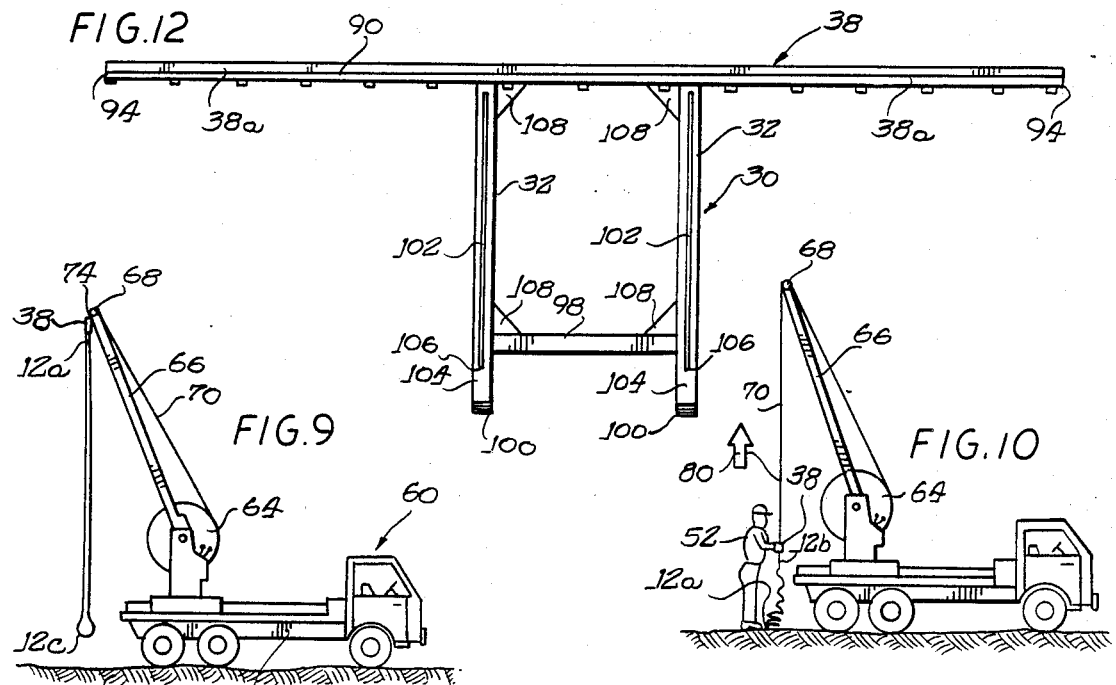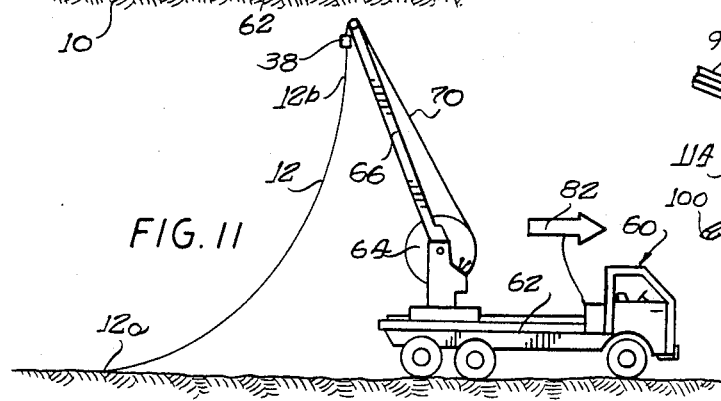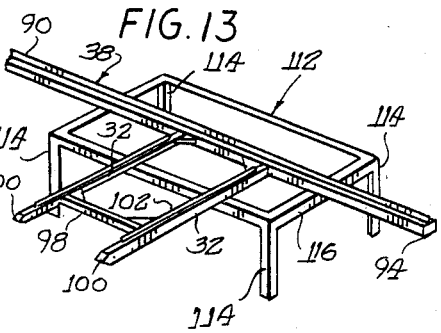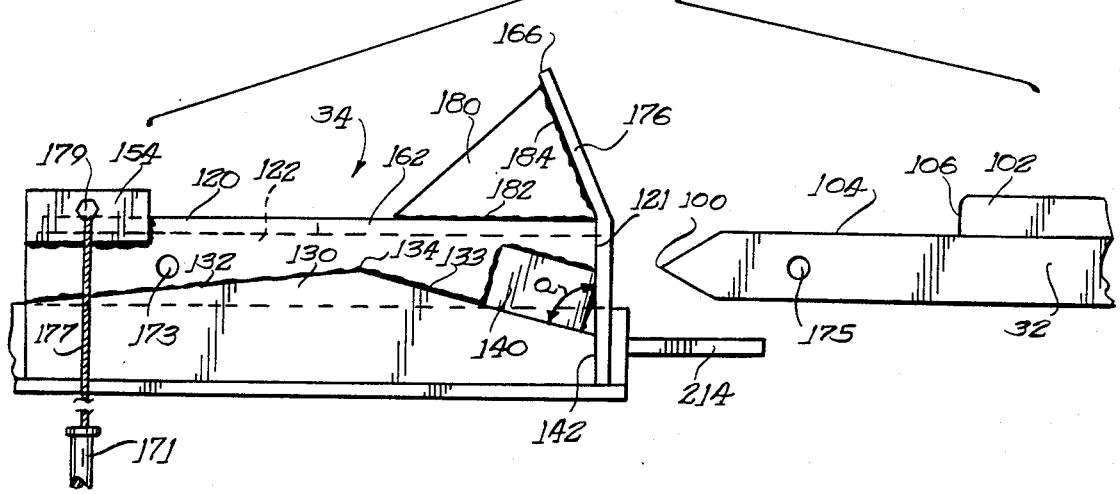

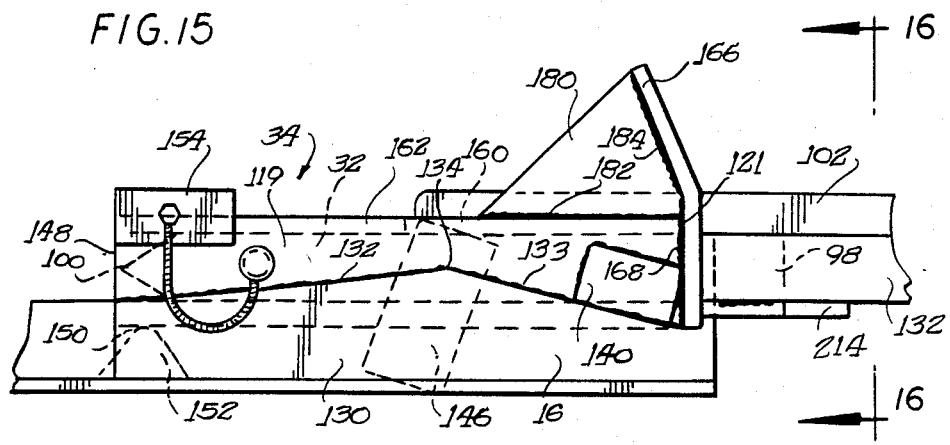
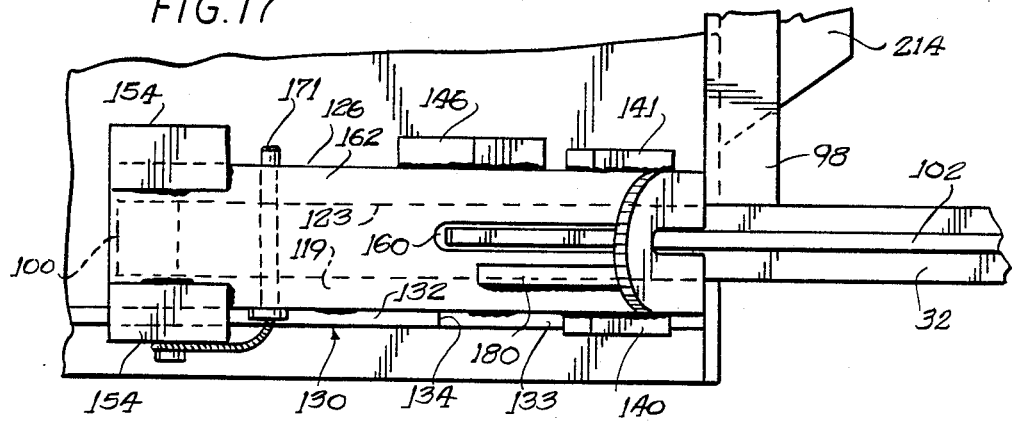
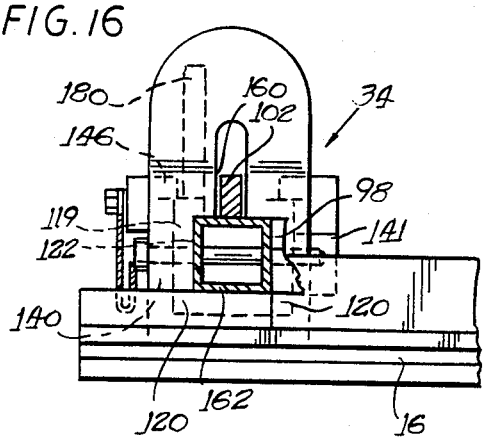
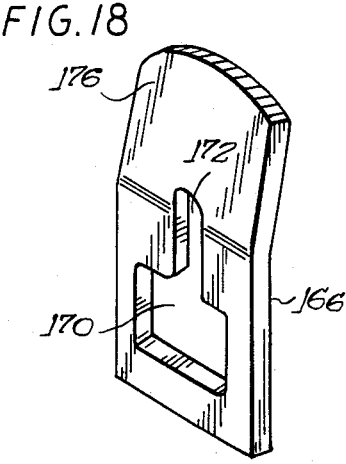

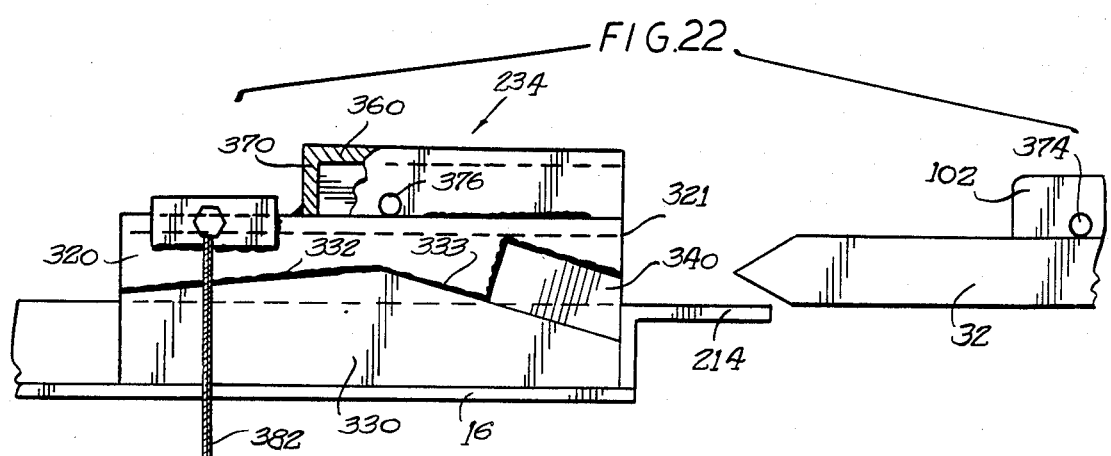
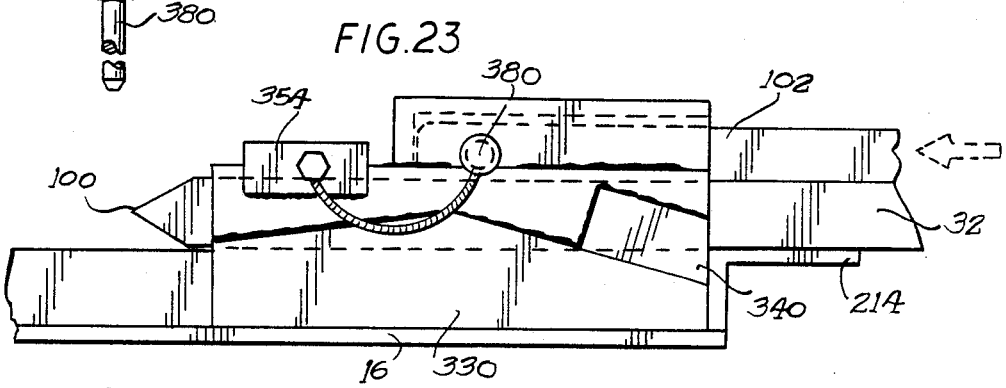
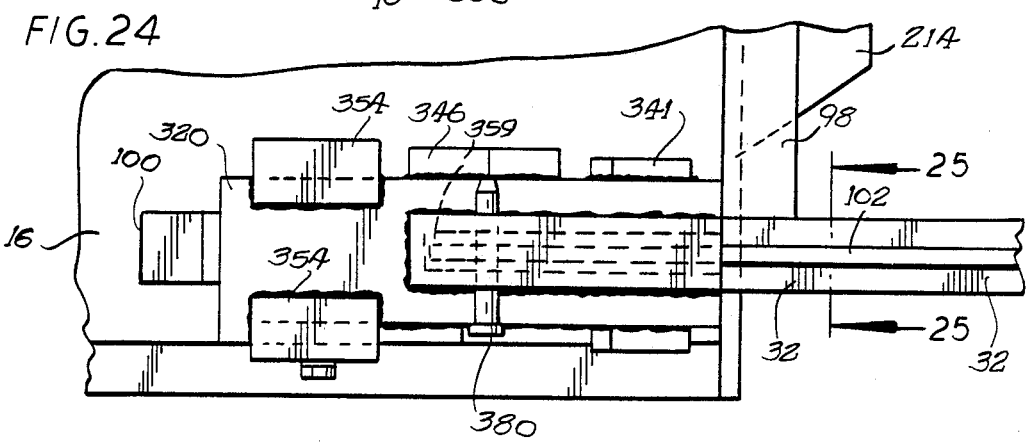
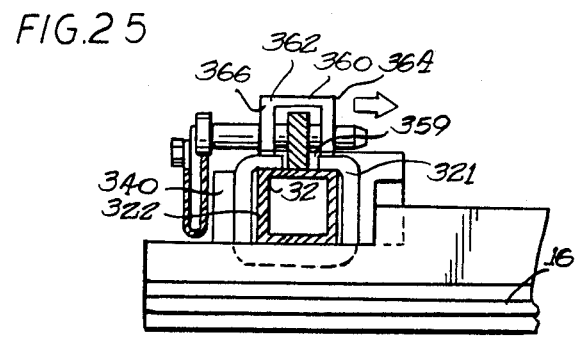

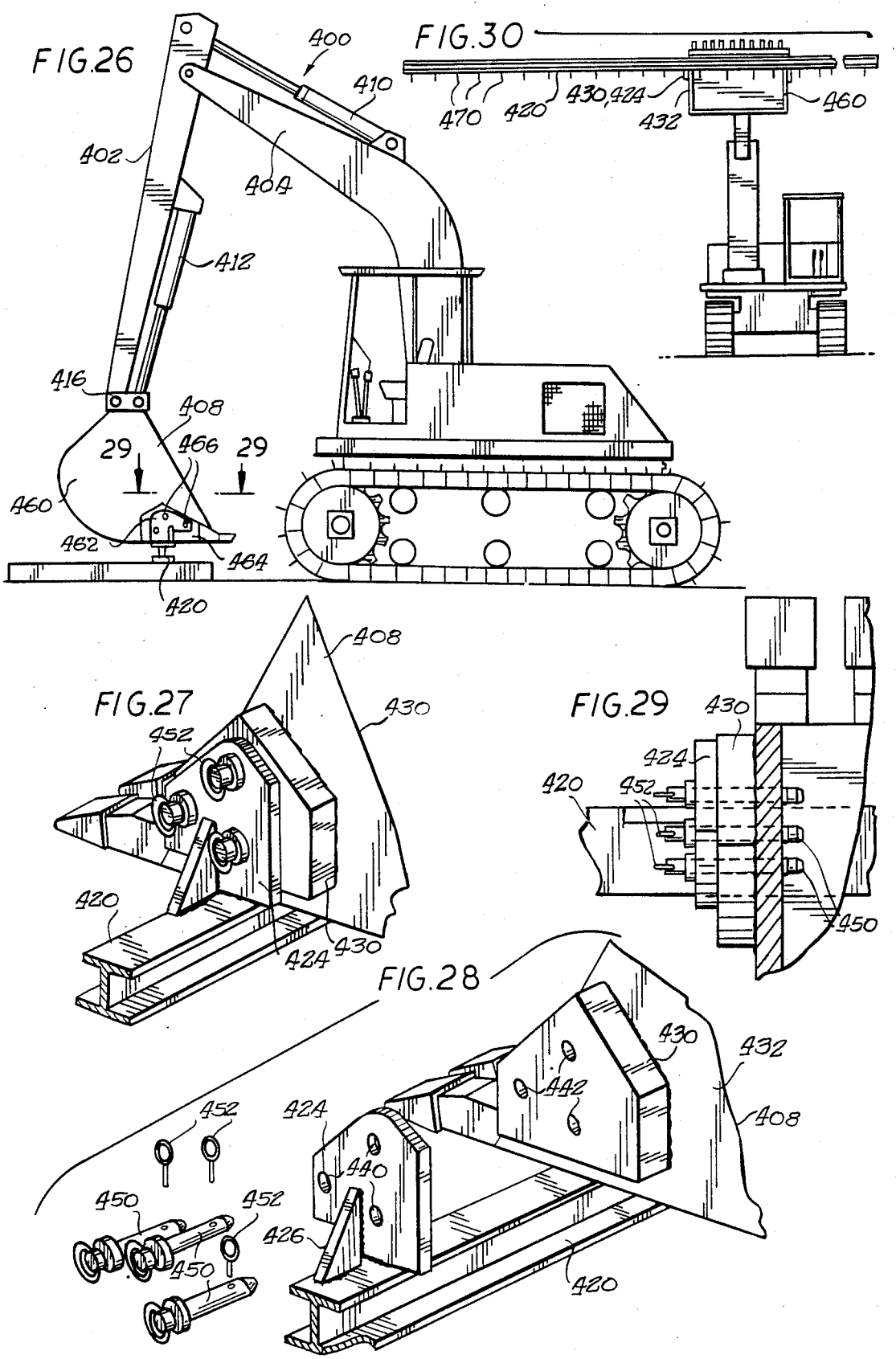

APPARATUS FOR TEMPORARILY COVERING A LARGE LAND AREA

BACKGROUND OF THE INVENTION

1. Field of the Invention

The present invention pertains to the temporary covering of a relatively large land area with flexible synthetic sheets.

2. Description of Related Art

It is frequently desired to cover a relatively large land area to keep the area dry and protected from rainfall, dew and the like, and also to prevent wind erosion of the land surface. Land areas may, for example, be used for sanitary landfill sites. Due to environmental and other sanitary concerns, operators of sanitary landfill sites have been required to provide a daily cover for sanitary landfill deposited during the course of the workday. According to currently accepted and environmentally mandated practices, a soil cover of a guaranteed six inch minimum depth is usually employed. The manpower required to deploy and recover the daily soil cover is very substantial, up to one fourth of a workday being devoted to working with the soil cover. Considerable cost savings could be realized if an alternative to the daily soil cover were available or if the rate of consumption of the soil cover or the very substantial amount of manpower required for its use could be reduced.

During the course of developing a sanitary landfill site, portions of the site remain undisturbed for relatively long periods of time while other portions of the site, located at the working area, need to be cleared of the soil cover at the beginning of each workday. It has been observed that, due to the porous nature of the sanitary landfill site the amount of soil cover consumed daily in this manner comprises a considerable portion of the total soil cover required. At some landfill sites a daily soil cover is not available and must be purchased from an outside source at considerable expense. In addition, the soil cover consumed each day results in a premature filling of the landfill site and constitutes an inefficient use of the site for its intended purpose.

Other areas of commercial endeavor are concerned with the covering of relatively large land areas. U.S. Pat. No. 3,727,656, for example, discloses foldable flexible synthetic plastic sheets for covering a grain stockpile. The flexible sheet material is constructed to form a flexible, balloon-like container which is enlarged as grain is poured therein. U.S. Pat. No. 975,802 discloses a stack cover used to protect hay and grain stacks. The temporary structure is formed from metal panels which are joined together at the corners of the structure.

In addition to agricultural applications, it is frequently desirable to cover athletic playing fields and U.S. Pat. Nos. 1,576,888; 2,578,135; and 2,848,233 disclose arrangements of partially overlapping flexible sheets which are joined together using rope or the like to form a large-size integrated covering system In other commercial applications, various arrangements have been employed to cover waste materials, whether stored in containers or deposited in a landfill site. U.S. Pat. No. 3,874,175 discloses a floating cover assembly used, in cooperation with a lined pit, to contain animal and livestock waste. U.S. Pat. No. 4,519,338 discloses a hardenable plastic foam to cover and seal a landfill or dump area. A vehicle having foam spray apparatus traverses back and forth over the dump area to form an integrated seal, obviating the need for a soil cover of compacted earth.

U.S. Pat. No. 1,871,571 discloses a tarpaulin of waterproof reinforced paper. The borders of the tarpaulin are reinforced with layers of sisal to afford reinforcement at a point of grommet attachments. U.S. Pat. No. 4,565,468 discloses a moisture barrier in which a layer of bentonite is disposed between opposing, overlying sheets stitched together in a quilting pattern.

A need still exists for simple and economical method and apparatus for providing a temporary daily cover for a large land area and in particular for covering a relatively large sloping land area to prevent moisture intrusion and wind erosion.

Turning now to the construction industry in general, it is sometimes more economical to form very large structures with the largest possible components that can be handled in a practical manner. U.S. Pat. No. 3,552,583 discloses a system for erecting a building structure by lifting a pair of curved wall sections which are pivotally supported at the ends of a beam. When the beam is raised, the panels may be swung into a mutually self-supporting position. As another example, U.S. Pat. No. 2,347,922 discloses a hoisting tong used to grasp and lift heavy metal plates and the like. As a further example of special limited use equipment, U.S. Pat. No. 4,159,059, provides a truss boom for a material-handling truck having what is commonly referred to as a "stinger arm", comprised of a series of telescoping sections which extend and retract to move a load carried at the end of the arm.

One type of construction machine in common use today is a front loader or bucket loader, used to transfer bulk materials from one location to another. Frequently, it is desired to adapt the bucket loader to lift or lower relatively massive discrete objects. For example, U.S. Pat. No. 4,200,423 discloses a storable boom mounted to the bucket of a construction machine, adapting the machine for lifting and lowering of objects in construction work. The boom is telescopically inserted in a pair of mounting brackets attached to a base plate which is welded to a top side of the bucket.

U.S. Pat. No. 4,329,103 discloses a framework attachment received in the bucket of a front-end loader to provide a boom structure device having a forwardly extending beam. U.S. Pat. No. 2,613,912 discloses a framework rig attachable to the bucket of a bulldozer or the like. The rig is used to set and pull fence posts. U.S. Pat. No. 3,587,887 is directed to a lifting boom consisting of three pivotally connected arms attached at the top and bottom walls of the bucket, which is used to lower a pipe into a trench, for example.

A need still exists, however, for a simple boom-like apparatus which adapts a front-end loader for lifting relatively large and/or heavy objects. In particular, there is a need to provide an apparatus of this type which is quickly and easily installed and removed from a conventional front-end loader on a frequent basis, such as several times a day.

SUMMARY OF THE INVENTION

It is an object of the present invention to provide a method of covering a relative large land area with a plurality of sheets of synthetic material, and in particular to provide a method of covering a sloping land area.

Another object of the present invention is to provide apparatus for use in the above method, to raise and lower a plurality of sheets in a partially overlapping arrangement, in a relatively short time, and with a minimum amount of labor.

A related object of the present invention is to reduce the amount of time required to employ and remove a daily cover of a landfill site. For example, using current techniques, as much as one-half of a workday at a landfill site may be required to deploy the daily soil cover.

Another object of the present invention is to provide an attachment to a front-end loader which adapts the loader to raise and lower relatively large, heavy objects, objects having a length several times greater than the longer dimensions of the front end loader.

Another object of the present invention is to provide a method of operating a landfill site obviating the use of a daily soil cover to protect the landfill site overnight or during periods of extended outage.

These and other objects according to the present invention which will become apparent from studying the attended description and drawings are provided in a method of covering a large land area with a flexible cover having first and second opposing ends, comprising the steps of:

providing a vehicle with a pivot arm pivotally mounted at one end thereof for movement between an upper position remotely above the land area and a lower position adjacent the land area;

mounting a cross member at one end of the pivot arm;

releasably attaching both ends of the cover to the cross member;

moving the vehicle to a first location on the land area;

lowering the pivot arm so as to render the cross member accessible to a workman on the land area;

releasing one end of the cover from the cross member for contact with the land area;

moving the vehicle to a second location on the land area remote from the first location so as to spread the cover over increasingly larger portions of the land area;

releasing the other end of the cover from the cross member so as to lay the cover on the land area.

In one embodiment, the method of the present invention is carried out by pivotally displacing a rigid lifting arm having a free end, with a cross member pivotally mounted to the free end of the arm.

In a second embodiment, the method of the present invention hangingly supports a crossarm from a flexible cable disposed at the free end of a pivotally displaceable support arm.

The objects of the present invention are also provided in a method of removing a cover of flexible material having first and second ends, from a large land area, comprising the steps of:

providing a vehicle with a pivot arm mounted at one end thereof movable between an upper position remotely above the surface of the land area and a lower position adjacent the land area;

mounting a cross member at one end of the pivot arm;

moving the vehicle to a first location on the land area adjacent a first end of the cover;

releasably attaching the first end of the cover to the cross member;

raising the pivot arm to its upper position so as to raise the first end of the cover above the land area;

moving the vehicle toward a second end of the cover;

lowering the cross member;

releasably attaching the second end of the cover to the cross member;

raising the pivot arm to its upper position so as to elevate the cover above the land area; and moving the vehicle so as to transport the cover to a remote location.

Other objects of the present invention are attained in an apparatus for adapting a front end loader having a bucket to raise and lower a sheet of synthetic flexible material, the apparatus comprising a cross member having opposed free ends and an intermediate portion;

a pair of spaced apart rearwardly extending extension arms joined at one end to the intermediate portion of the cross member and having second, opposed free ends;

a lateral member extending between the extension arms adjacent the free ends thereof;

upstanding reinforcing spines upwardly extending from the extension arms and having free ends spaced from the free ends of the extension arms; and means for realizable attaching the cover to the cross member to facilitate mounting and dismounting of the cover therefrom.

Further objects are obtained in a combination of the above apparatus with a pair of spaced apart generally parallel tubular enclosures for attachment to the bucket having forward arm-receiving openings;

a pair of ears upstanding from forward ends of the enclosures defining a spine-receiving aperture; and the free ends of said extension arms dimensioned for reception in the enclosures with the spines received in the ears so that the support arms receive cantilever support from the enclosure and the ears as the bucket is raised and lowered.

An outwardly directed ledge extending from a forward edge of the bucket may also be provided so as to lie generally between the tubular enclosures, said lateral member cooperating with the extension arms to rest on the ledge as the extension arms receive support from the enclosures and the ears.

BRIEF DESCRIPTION OF DRAWINGS

In the drawings, wherein like elements are referenced alike:

FIG. 3 is a fragmentary perspective view of a tarp and support assembly;

FIG. 4 is a fragmentary plan view of the tarp of FIG. 3;

FIGS. 5-8 show a sequence of steps for deploying a tarp using methods and apparatus according to present invention;

FIG. 9 shows an alternative apparatus for carrying a tarp according to the method present invention;

FIG. 10 shows a first end of the tarp being disconnected from the apparatus of FIG. 9;

FIG. 11 shows the tarp of FIG. 10 being stretched over a land area;

FIG. 12 is a top plan view of a support assembly adapted for vehicle mounting to transport the flexible cover;

FIG. 13 shows the support assembly in a stored position;

FIG. 14 shows a first embodiment of mounting socket attached to a vehicle for receiving an arm of the support assembly;

FIG. 15 shows a support arm fully received in the mounting socket of FIG. 14 and is taken from a point of view along the line 15—15 of FIG. 2;

FIG. 16 is a fragmentary cross-sectional view of the socket of FIG. 14, mated with a support arm, taken along the line 16—16 of FIG. 15.

FIG. 17 is a top plan view of the mated socket and support arm illustrated in FIG. 15;

FIG. 18 is a perspective view of the mounting plate portion of the mounting socket of FIG. 14;

FIG. 19 is a perspective view showing an alternative embodiment of a tarp used in the present invention;

FIG. 20 is a fragmentary plan view of the tarp of FIG. 19;

FIG. 21 is a fragmentary end view showing the tarp of FIG. 19 mounted to the support assembly;

FIG. 22 is a side elevational view of the preferred mounting socket according to principles of the present invention;

FIG. 23 shows the mounting socket of FIG. 22 mated with the support arm of the preceding Figures;

FIG. 24 is a fragmentary top plan view of the socket and support arm of FIG. 23;

FIG. 25 is a fragmentary cross-sectional elevational view taken along the line 25—25 of FIG. 24;

FIG. 26 shows another alternative apparatus for carrying a tarp, according to the method of the present invention;

FIG. 27 is a fragmentary perspective view, taken on an enlarged scale, of a portion of FIG. 26 showing the mounting of a tarp-carrying crossarm to a bucket portion of vehicle;

FIG. 28 is an exploded perspective view of FIG. 27;

FIG. 29 is a fragmentary cross-sectional view taken along the lines 29—29 of FIG. 26; and FIG. 30 is a front elevational view of the vehicle of FIG. 26, with crossarm attached, and the bucket thereof in a raised position.

DETAILED DESCRIPTION OF THE PREFERRED EMBODIMENT

By using the method and apparatus according to principles of the present invention, significant cost savings can be achieved for covering large land areas, such as sanitary landfills, which heretofore required a daily soil cover. A significant portion of a workday was previously required to apply and subsequently remove the daily soil cover. Due to the porous nature of the landfill and the irregular surface usually present, the daily soil cover, in most instances, could not be recovered. Further, in many landfill sites the soil used for the daily cover had to be purchased from an outside source and, due to the fairly high rate of soil consumption, comprised a substantial cost item. Savings of these costs is realized with the method and apparatus according to principles of the present invention, wherein synthetic flexible cover are deployed and retrieved with a minimum amount of labor, typically a two-man team, for a relatively small portion of a workshift.

Figure 1:
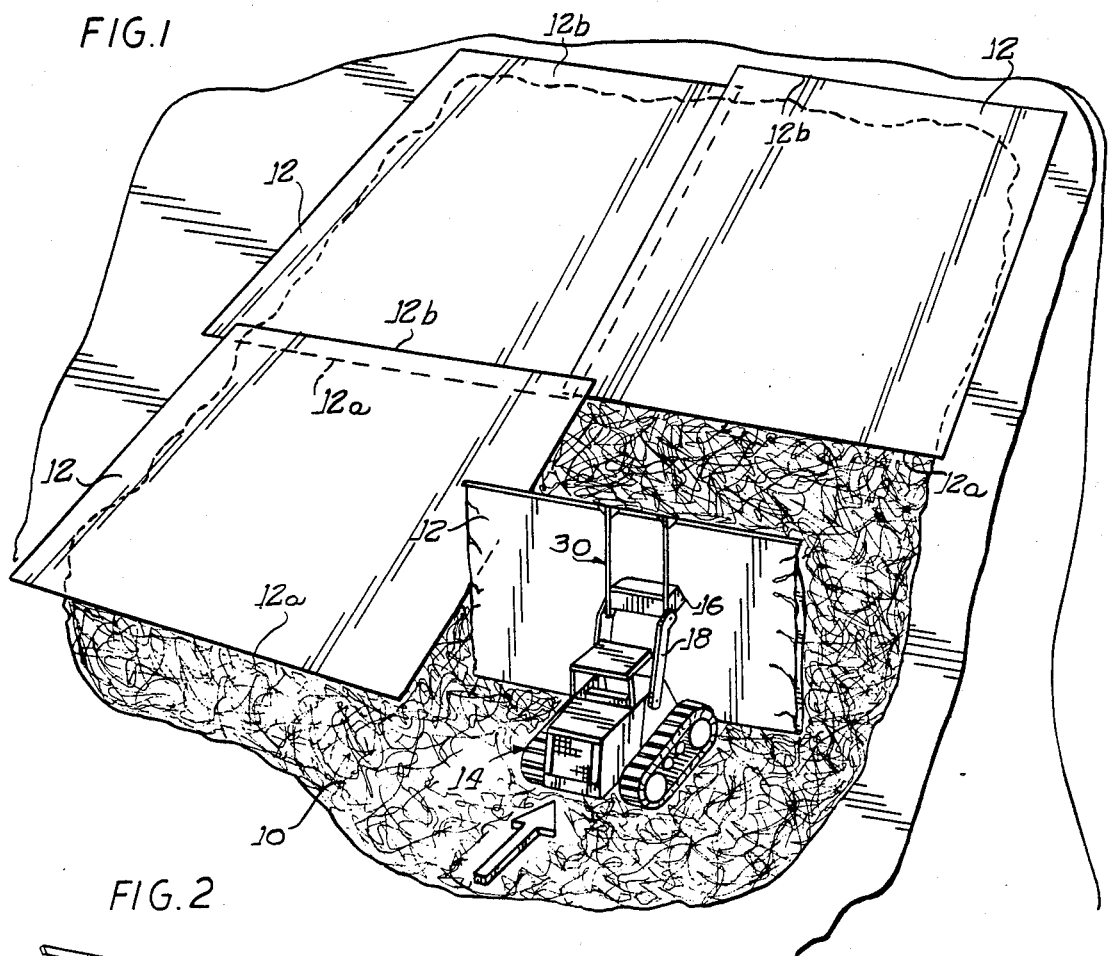
FIGS. 1 and 2 illustrate the preferred method and apparatus according to principles of the present invention for covering a large land area with a plurality of tarps.

Referring now to the drawings, and initially to FIG. 1, a relatively large land area 10 is covered with a plurality of overlapping, flexible cover sheets or tarps 12 which are preferably made of a synthetic material. The preferred material for tarp 12 is a 14 ounce weight nylon-reinforced neoprene. In the preferred embodiment, land area 10 comprises a sanitary landfill site which is required to be covered during idle periods, such as overnight, and holidays when work crews are not present. The tarps 12 must be deployed to cover land area 10 at the end of a business day and must be removed early the following day when landfill operations are resumed.

In order to minimize the labor time required to deploy the tarps, it has been found advantageous to configure the tarps with a relatively large size such as 50 foot by 50 foot square panels. Even though these larger size tarps, weighing in excess of 250 pounds, are too heavy for manual deployment, it has been found more efficient to cover a land area of given size with a fewer number of larger tarps as opposed to smaller tarps which theoretically can be manually deployed. The method and apparatus according to principles of the present invention greatly reduce the labor requirement and results in very substantial cost savings with an effective lengthening of that portion of the workday devoted to landfill operations.

According to one aspect of the present invention, folding of the tarps 12 is reduced to a minimum to help speed the deployment over the land area 10. In the preferred embodiment substantially an entire edge of the tarp is grasped at one time and the tarp is lifted above the land area 10 during transport from one location to another. If the entire length of the tarp can be lifted above the land area by a vehicle available for this purpose (such as a crane, for example) the tarp need not be folded. However, it is usually desirable to use smaller, commonly available light machinery to lift the tarp of the preferred embodiment above the ground surface.

The preferred vehicle used in practicing the present invention, generally indicated at 14, comprises a front loading earth moving vehicle commonly referred to as a 977 or 973 track loader. The vehicle 14 includes a front loading bucket 16 pivotally mounted at the free ends of lift arms 18. The arms 18 are hydraulically operated for swinging about their pivotal mounting 20. Also included are hydraulic pistons or the like actuators for pivoting or swinging bucket 16 about its pivotal mounting 22 to the free ends of arms 18.

Figure 2:
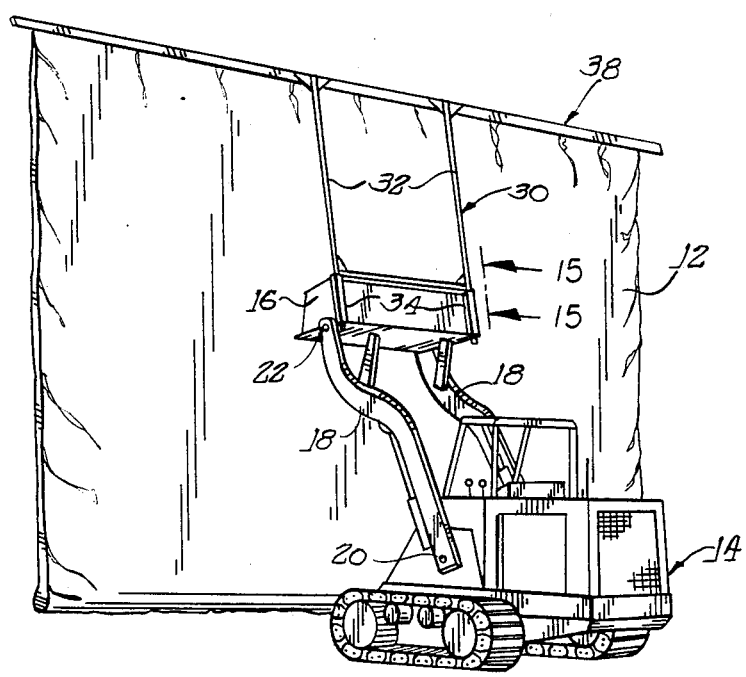

Due to the large size of the tarps of the preferred embodiment the arms of vehicle 14 are not long enough to raise the entire tarp off the ground by grasping a single end thereof. Further, even with the tarp doubled or folded over upon itself as illustrated in FIG. 2, arms 18 still are not long enough to elevate the tarp above the surface of land area 10. According to one aspect of the present invention, a novel support assembly generally indicated at 30 continuously supports opposed ends of the tarp and is provided to effectively extend the length of arms 18 so as to elevate tarp 12 above the surface of land area 10 during transport between remote locations. Briefly, the support assembly includes support arms 32 extending from mounting sockets. A first embodiment of the mounting socket is illustrated in FIGS. 14-18, and a second, preferred embodiment of the mounting socket is illustrated in FIGS. 22-25. The mounting sockets are attached to bucket 16 and are joined at their free ends to a crossarm generally indicated at 38. The crossarm is dimensioned to completely extend along the opposed sides 12a, 12b of the tarp 12. The support assembly, illustrated in FIG. 12, will be described in detail, later herein. As will be described further herein, apparatus, including the mounting socket 34, is provided for mounting the support assembly to bucket 16 of the earth-moving vehicle.

With opposed ends of the tarp continuously supported, the tarp may be folded in two so as to reduce its vertical height, allowing the use of a smaller vehicle to raise the tarp completely above the surface of the landfill area as the tarp is moved between remote locations. This is particularly important for the land area of the preferred embodiment which, by virtue of its composition as a sanitary landfill, might contain elements such as broken bottles and jagged scrap metal which would snag and tear flexible covers dragged across the landfill surface. As will be seen, in the preferred embodiment, the entire tarp, extending 50 feet by 50 feet in its major surface dimensions, and weighing in excess of 250 pounds is lifted in its entirety from a remote storage location and is transported to a portion of the landfill site to be covered, being deployed there to be spread over a portion of the landfill in a minimum number of simple, easily executed steps. FIGS. 1a and 2, for example, show the tarp 12 loaded on vehicle 14 for delivery to an open portion of the landfill area 10.

Referring to FIGS. 3 and 4, the tarp 12 includes a reinforced border 42 wherein the tarp material is folded over and stitched along the edge or margin thereof. The preferred attachment of tarp 12 to crossarm 38 is by eyelets 44 affixed to the margin 42 of the tarp cover. Because the tarps 12 are formed in a square configuration, they may be rotated 90 degrees if the eyelets along edges 12a, 12b should become worn. If desired, relatively rigid, inflexible supports or stays can be sewn in the margin 42, at the ends 12a, 12b of the tarp which are to be suspended from vehicle 14. The use of such stays would reduce bunching or sagging of the tarp between the eyelets 44, it generally being desirable to maintain the ends 12a, 12b of the tarp in a taut condition. Such, however has been found to be unnecessary if attachments to the crossarm 38 are made at substantially regular intervals.

Referring now to FIGS. 5-8, a first embodiment of a method according to principles of the present invention will be described. After attaching the first and second ends 12a, 12b of tarp 12 to crossarm 38, the tarp is transported by vehicle 14 from a first storage position on the surface of land area 10. The ends 12a, 12b of the tarp are preferably releasably secured to the crossarm. As illustrated in FIG. 5, both the lift arm 18 and the bucket 16 of vehicle 14 are pivoted to an upright position. The support assembly 30 attached to bucket 16 is thereby tilted for maximal height of its free end (i.e., the end connected to crossarm 38) above the surface of the land area. Thus, the vehicle and support assembly are configured for maximum lifting height as tarp 12 is carried about the land area. As illustrated in FIG. 5, vehicle 14 moves in the direction of arrow 49, transferring tarp 12 between remote locations such as a storage location adjacent the land area and a desired position on the land area. The tarp 12 is preferably placed in a partially overlapping relationship with previously deployed tarps so as to form a continuous shingle-like covering over a relatively large land area, typically comprising a quarter acre or more in size.

As illustrated in FIG. 5, the lowermost folded end 12c of the tarp is raised a substantial distance above the land area surface. Those skilled in the art familiar with earth moving vehicles will readily appreciate that, due to the uneven terrain of a landfill area, and the suspension typical of earth moving equipment, the vertical position of the bucket 16 will dip occasionally while the vehicle is in motion, and bucket 16 will effectively be lowered closer to the land area surface. Accordingly, it is important that the lower free end or fold of the tarp clear the land area surface at all times during its transport thereacross.

Referring additionally to FIG. 6, when vehicle 14 arrives at the desired position on land area 10, the lift arm 18 of the vehicle is lowered and bucket 16 is pivoted in the direction of arrow 50 to lower the crossarm 38 to a convenient height for access by an operator 52. The operator releases the first end 12a of the tarp from crossarm 38, allowing the end to rest on the land area surface. The second end 12b of the tarp remains attached to crossarm 38 which initially remains in position overlying the folded major portion of the tarp as illustrated in FIG. 6.

Referring additionally to FIG. 7, with the first end 12a of the tarp detached, the lift arm 18 and bucket 16 are pivoted to a maximally raised position so as to lift the major portion of tarp 12 above the land area surface. Either simultaneously therewith or shortly thereafter, vehicle 14 is advanced in the reverse direction of arrow 54 whereby increasingly larger portions of the land area surface are covered with tarp. Referring to FIG. 8, with the second portion of the tarp in a fully extended position over the land area, the lift arm 18 and bucket 16 of the vehicle are again lowered to bring crossarm 38 to a convenient working height for operator 52. The second end 12b of the tarp is thereafter released from the crossarm and allowed to drop onto the land area surface. Any portion of tarp 12 adjacent the end 12a remaining unfolded is of a minor size which can easily be stretched over the land area by the operator. Thus, the entire extent of tarp 12 is stretched over the land area surface without requiring further adjustment to the tarp.

Referring now to FIGS. 9-11, an alternative embodiment of a method according to the present invention will be described with reference to a vehicular crane 60, which includes a cable reel 64 and a boom 66 mounted on a flatbed or truck chassis 62. Cable 70 is stored on reel 64 and the reel is motor driven in opposite directions to pay out and take up the free end 74 of the cable which carries the crossarm 38. As illustrated in FIG. 9, the tarp is folded in half with opposing ends releasably attached to crossarm 38. As before, the folded lower end 12c of the tarp has substantial clearance above the surface of land area 10 so that the folded end of the tarp remains clear of contact with the land area as the vehicle rocks and pitches as it traverses the land surface.

Referring to FIG. 10, when crane 60 arrives at the desired location on the landfill area, the reel 64 is rotated so as to pay out cable 70 thereby lowering the crossarm 38, preferably to a convenient working height allowing workman 52 access to the crossarm. The first end 12a of the tarp is thereafter released and allowed to fall to the land area surface. Thereafter, reel 65 is rotated in an opposite direction to take up cable 70 raising crossarm 38 in the direction of arrow 80. Take up of cable 70 continues until the crossarm is raised to a maximum working height adjacent a free end 68 of boom 66 so as to raise the major portion of tarp 12 above the land area surface.

Crane 60 is advanced in the direction of arrow 82 to further elevate and unfold any remaining folded portions of tarp 12. With continued advancement of the crane 60 in a direction of arrow 82, cable 70 is paid out so as to lower the second end 12b of the tarp toward the land area, while spreading the tarp over continuously larger portions of the land area.

Referring now to FIGS. 26–30, an excavator type of vehicle is generally indicated at 400. The excavator includes articulated arms 402,404 for carrying a bucket 408. An hydraulic actuator 410 raises and lowers the bucket 408, and an hydraulic actuator 412 pivots the bucket about a pivot point 416.

A crossarm 420 is attached to bucket 408 in a manner to be described herein, and is similar to the aforedescribed crossarm 38, except for having a cross-sectional configuration resembling an I-beam. Referring to FIGS. 27–29, crossarm 420 includes a mounting plate 424 welded at its lower end to an I-beam member. A gusset or reinforcing plate 426 supports mounting plate 24 against outward deflection. A reinforcement plate 430 is welded along its outer peripheral edge to a side wall 432 of bucket 408 (see FIG.30). A series of apertures 440 are provided in mounting plate 424, and are aligned in registry with a series of apertures 442 formed in reinforcement plate 430. The alignment of apertures 440,442 allows the insertion of locking pins 450 to secure a mated joinder of plates 424,430, thus mounting crossarm 420 to bucket 408. Keeper pins 452 prevent locking pins 450 from becoming disengaged with plates 424,430 during operation of vehicle 400.

Bucket 408 includes an opposed side wall 460 with a mirror image mounting arrangement including a mounting plate 62 and a reinforcing plate 464. A series of locking pins 466 secure the crossarm to bucket side wall 460 in the manner described above with reference to the opposed side wall 432. The relative size, gauge, and configuration of the various mounting and reinforcing plates for attaching the crossarm to bucket 408 have been found to provide a superior strength, resisting weld fracture and fatigue of the bucket portions bearing the load of crossarm 420 and any tarp that may be attached thereto.

As can be seen in FIG. 30, crossarm 420 preferably has the same overall length and general proportions as the cross arm 38 of the various vehicles described above. In the preferred embodiment, crossarm 420 has a length slightly less than 50 feet, the lateral peripheral dimension of the tarp used in the preferred embodiment. As before, a series of swingable mounting hooks 470 are provided throughout the length of the crossarm, to adjust for differences in eyelet spacings of the tarp.

Referring again to FIGS. 5–8, retrieval of tarp 12 is, generally speaking, accomplished by reversing the steps described above for covering the land area. Since it is important that the vehicle not be allowed to travel over the tarp, the vehicle 14 is initially brought to the second end 12b of the tarp, at a location adjacent an edge of the covered land area. The crossarm 38 is lowered close to the ground, adjacent the tarp end 12b. The operator attaches the end 12b of the tarp to the crossarm and advances toward the first end 12a of the tarp.

The lift arm and bucket are thereafter pivoted so as to elevate the crossarm 38, raising the end 12b of the tarp as high above the land area surface as is possible. Thereafter, the vehicle is moved toward to first end 12a of the tarp with increasingly greater portions of the tarp being suspended from crossarm 38 as the vehicle is advanced. The vehicle is stopped as it approaches the folded bottommost portion of the tarp, and the lift arm and bucket are lowered so as to bring the crossarm adjacent the land area surface. In many instances, the lowering of the crossarm will place the crossarm adjacent the first end 12a of the tarp. However, for those instances where this does not occur, only a minor portion of the tarp need be handled to connect the remaining end 12a of the tarp to crossarm. Thereafter, the lift arm and bucket are raised to elevate the folded tarp above the land area surface to prepare for its transport to a remote location, such as the support base 112 of FIG. 13.

In a similar manner, the steps described above with reference to FIGS. 9–11 can be reversed to retrieve the tarp. With crane 60 moved to an edge of the land area, the cable 70 is paid out so that the second end 12b of the tarp can be attached to the crossarm, adjacent the land area surface. Thereafter, the cable 70 is taken up and if necessary the crane is slowly advanced toward the other, first end 12a of the tarp to avoid dragging the tarp across the land area surface. With continued travel of the crane the cable is taken up until the crossarm reaches the free end 68 of boom 66. Thereafter, the crane is advanced toward the first end 12a of the tarp until the lowermost portion of the tarp hung from the crossarm is about to be run over by the vehicle. The cable 70 is then paid out to lower crossarm 38 into a position above the land area surface conveniently accessible to a workman. The remaining first end 12a of the tarp is then brought to crossarm 38 and hung therefrom. With subsequent pickup of cable 70 the entire tarp 12 is raised above the surface of the land area, as illustrated in FIG. 9, making the tarp ready for transport to the remote, storage location.

Referring now to FIG. 12, construction of the support assembly 30 will be described in greater detail. Due to its large size and cantilevered support from vehicle 14, it is generally desirable to make the support assembly as lightweight as possible. However, as pointed out above, the tarps are of a considerable size and weight and the crossarm is subjected to a substantial amount of bending and impulse forces due to vibration as the vehicle traverses the land area surface. According to one aspect of the present invention it has been found desirable to brace or reinforce the support assembly against the deflection caused by downwardly directed impulses applied to the crossarm. For example, referring to FIGS. 3 and 12, crossarm 38 is provided with an upstanding spine 90 extending from the upper surface 92 of the crossarm. This prevents a bowed distortion caused by a downward drooping of the free ends of the crossarm.

As can be seen in FIG. 3 and additionally in FIG. 21, a second bar-like support spine 91 is attached to the underside of crossarm 38, generally opposite the upwardly extending spine 90 to provide additional support against bending. For the efficient utilization of vehicle 14 it is generally desirable that tarps 12 be made as large as possible so that, with the support assembly applied to the vehicle, at least a minimal clearance is provided between the land area surface and the lower folded end of the tarp. Spines 90, 91 provide reinforcement for the free end portions 38a of crossarm 38 which are cantilevered from the rearwardly extending support arms 32. Support assembly 30 further includes a rear lateral member 98 attached at each end to support arms 32 adjacent the free ends 100 thereof.

The crossarm 38 herein described may be used in the method illustrated in FIGS. 9–11 to provide mounting of the tarp. The crossarm may be suspended from the end of cable 70 by any suitable means including an "A" frame structure of rigid or flexible stabilizing elements.

Referring now to FIGS. 12–17, rib-like spines 102 are attached to the upper surface 104 of the support arms to reinforce the support arms against bending or bowing.

As will be seen, the free ends 100 of the support arms 32 provide cantilever support for the major extent of the support arms 32 and the crossarm 38. As illustrated in FIG. 12, the free ends 106 of the reinforcing spines 102 are spaced from the free ends 100 of the support bars, for reasons which will become apparent herein. Reinforcing corner plates 108 reinforce the joinder of support arms 32 to crossarm 38 and rear lateral member 98.

As has been mentioned above, the tarp used in the preferred embodiment has a square configuration with 40 foot long edges. Crossarm 38 has a length slightly greater than 40 feet in order to provide substantially continuous support for the tarp edges. The method and support apparatus embodying principles according to the present invention are commercially attractive in several respects, which, notably include the ability for a two-man crew to cover land areas of substantial size on a routine, daily basis. Another important aspect of the present invention, as will be seen further herein, is the adaptation of the support apparatus for use with conventional, commonly available earth moving equipment such as the front end bucket loading vehicle 14. The support assembly illustrated in FIG. 12 is adapted for ready connection and disconnection from vehicle 14 as will be seen shortly herein.

It is desirable that the storage of the support assembly 30, required twice daily when used for a daily cover, is also compatible with a two-man crew assignment. Due to the combined weight of the 50 foot long crossarm, the support arms, the reinforcing spines and the lateral member 98, manual lifting of the support assembly 30 is virtually impossible, even with a two-man crew. Accordingly, there is provided a support base 112 dimensioned to engage both the crossarm 38 and the support arms 32. The support base illustrated in FIG. 13 is constructed of welded angle members in which four legs 114 support an upper rectangular frame 116. If desired, a roll-off metal container of the type transported by a vehicle for waste removal can also be used. The height of such roll-off container, or alternatively, the height of legs 114 is chosen to be approximately equal to the height of bucket 16 with lift arm 18 of the vehicle in a fully lowered position. An operator of the vehicle is thereby able without assistance, to maneuver the bucket 16 so as to insert the free ends of support arms 32 in the mounting sockets 34.

Referring now to FIG. 14, a simplified installation and removal of support assembly 30 from bucket 16 is provided in one aspect, by mounting sockets 34 which illustrate a first embodiment of releasable support bar attachments according to the present invention. A second more preferred embodiment of the mounting sockets will be described below with reference to FIGS. 22–25. Referring to FIGS. 14–18, mounting sockets 34 include a generally tubular enclosure 120 defining an internal passageway 122 dimensioned to receive support arm 32. As mentioned above, and as illustrated in FIG. 34, the tubular enclosures 120 are preferably welded to the upper ends of bucket 16. However, as with the crossarm and support arms of the support assembly, even tubular enclosures of relatively heavy gauge are not alone sufficient to successfully withstand the loads applied thereto. In addition to a static loading caused by the weight of the tarp, impulsive stresses are generated when the support assembly, fitted with a tarp, is carried across a land area surface of relatively uneven or rough grade.

Although the weight of the tarp is distributed along the length of crossarm 38, the entire weight of the tarp and the crossarm is localized at the free ends of the support arms 32. As the vehicle encounters a "bump" in the terrain, the weight of the tarp and crossarm are applied to the mounting sockets through the moment arms of support arms 32, thereby generating a considerable impulsive stress in the mounting sockets. As will be seen a number of different reinforcements are added to the mounting sockets to provide a continuous reliable operation. These reinforcements were developed during development of certain aspects of the present invention, and, as will be described in greater detail herein have been found satisfactory to prevent fatiguing or cracking of the mounting sockets and the front-loading bucket to which the sockets are attached.

The support arms 32 of assembly 30 are preferably made of hollow steel tubes of rectangular cross section. Despite the relatively heavy gauge of the walls of the support arms and the reinforcement provided the support arms by the bar-like spines 102, the mated support arm/mounting socket combination was observed to repeatedly flex as the vehicle to which they were mounted traversed the surface of a landfill area, loaded with a tarp ranging in weight between 250 and 300 pounds. Due to the cantilever mounting of arms 32, any downwardly directed impulsive stresses are resolved in the mounting sockets 34.

In order to reinforce the mounting sockets, a system of relatively heavy gauge steel plates are welded thereto. For example, referring to FIG. 14, a reinforcing plate 130 is dimensioned to overlie the major portion of the enclosure sidewall area. Reinforcing plate 130 has the shape of a five-sided polygon generally rectangular in its side and bottom portions and having V-shaped upper edges 132, 133 which includes an outside corner 134 located generally midway along the portion of support bar 32 received therein (see FIG. 15) when the support bar is fully mated with the mounting socket 34. In the preferred embodiment, plate 130 comprises an integral portion of bucket 16 and provides a major point of securement of enclosure 120 to the bucket. The outer upright wall 119 of enclosure 120 is preferably continuously welded along the upper edges 132, 133 of plate 130.

A second, substantially smaller and generally rectangular plate 140 abuts the upper edge 133 of plate 130, adjacent its forwardmost end 142. As indicated in FIG. 14, the forward portion of upper edge 133 is disposed at an angle of approximately seventy degrees from the forward face 121 of the mounting socket. As indicated in FIG. 17, the plates 130, 140 are of substantially the same thickness, with plate 140 being slightly thicker. As shown in FIG. 17, a second plate 141, substantially identical to plate 140, is welded along its outside edge to the inner wall 123 of enclosure 120.

Referring again to FIG. 17, a generally rectangular interior reinforcing plate 146 is inclined, also at an angle of approximately seventy degrees, to the front, upright surface 121 of enclosure 120. Plate 146 spans the entire height of the interior upright sidewall of enclosure 120 (as indicated in phantom in FIG. 15) and is generally medially positioned with respect to the inserted portion of support bar 32, that portion enclosed within mounting socket 34, as illustrated in FIGS. 15 and 17. Whereas the plate 130 provides a major point of support for tubular enclosure 120 at the outer side of the enclosure, the internal support plate 146 provides a major point of attachment for its interior side. The lower end of support plate 146 is welded to the upper surface of bucket 16. The rear end 148 of enclosure 120 is welded at 150 to a rib 152 which preferably forms an integral portion of bucket 60 but may also be added thereto by welding or the like joinder.

The upper rear corners of tubular enclosure 120 are reinforced by angle plates 154, which are generally L-shaped in cross-section. The corner plates 154 are preferably continuously welded at their outer edges to the corners of tubular enclosure 120 to provide a reinforcement thereat so that the enclosure will successfully withstand upward pressure imparted by the free end 100 of support bar 32 when crossarm 38 is loaded with a tarp and especially when the loaded vehicle 14 traverses a rough or bumpy road. As mentioned, support bar 32 is supported by mounting socket 34 with a cantilever support.

The outer surfaces of bar 32 continuously engage the inside sidewalls of enclosure 120 to provide a secure point of attachment between the inside portions of mounting socket 34 and bucket 16. Any substantial clearance within the internal passageway 122 will cause a rocking or pivoting of the support bar, generally at the frontal edge 121 of enclosure 120. Due to the general proportion of the support arms 32, having an elongated axis substantially longer than the relatively smaller cross-sectional dimensions, a close fit of the support arms within the mounting sockets might induce an oscillatory motion when subjected to an impulsive force at their free ends located adjacent the tarp.

Such vibratory or oscillatory motion, left uncontrolled, could greatly degrade the structural integrity of the support system. Accordingly, a generally horizontally extending ledge 214 is provided at the forward end of bucket 16 to eliminate or at least substantially dampen any such vibratory motion of the support arm as well as the other structural members in the tarp attached thereto. Referring again to FIG. 14, a forwardly extending ledge 214 engages the underside surface of rear lateral member 98 providing support for the central portion of support assembly 30. Thus, a three-point support system is provided to dampen and preferably eliminate downwardly directed impulsive forces when a tarp carried by vehicle 14 is bounced up and down. In particular, when sustaining a downwardly directed impulse, the free ends of support bars 32 are supported at the upper ends while the lower portion of rear lateral arm 98 is supported from below by ledge 214. As illustrated in FIG. 17, support ledge 214 does not extend so far as to underlie the support arms 32, the mounting sockets 34 being generally satisfactory for this purpose. However, if desired, the ledge 214 could be extended so as to underlie the portions of support arms 32 adjacent the rear lateral member 98.

As described above, support bar 32 is reinforced at its upper edge by a bar-like spine 102. As can be seen in FIG. 17, the spine 102 is substantially narrower than the width of support arm 32. The width of spine 102 is preferably approximately one-third the width of support bar 32 or less, so as to provide desired cooperation with mounting socket 34 as will now be described. According to one aspect of the present invention, the spine 102 extends into a substantial portion, at least one quarter and preferably one half the depth of the tubular enclosure 122, in the manner illustrated in FIGS. 15 and 17. In order to accommodate the insertion of support bar 32 with its upwardly extending spine 102, the tubular enclosure includes a slot 160 formed in its upper wall 162. The slot 160 is positioned along the centerline of enclosure 120 and has a width closely corresponding to the width of spine 102 so as to limit the lateral displacement of support bar 32 joined thereto.

Although it is possible to configure the support channel 120 to have an outline corresponding to the combined cross sections of support bar 32 and spine 102, it has been found advantageous in practicing the present invention to provide enclosure 120 with a spine-receiving slot and a cross section 122 closely corresponding only to the cross section of support bar 32. Referring now to FIG. 16, a fragmentary cross-sectional view is shown illustrating the front elevation of mounting socket 34. Enclosure 120 is illustrated in FIG. 16 in phantom and, as can be seen therein, has a generally square-shaped cross section with a square-shaped channel or interior passageway 122. Support bar 32 has a body 162 also comprising a tubular channel, preferably of square cross section and dimensioned for a relatively close tolerance fit within passageway 122.

According to another aspect of the present invention, the forward end of mounting socket 34 includes a plate-like ear 166, the rear surface of which is welded at 168 to the forward edge 121 of enclosure 120 (see FIG. 15). Ear 166 includes a central opening 170 configured to receive the combined cross section of the support arm 32 and the spine 102, with a relatively close tolerance fit. Ear 166 includes a generally planar body portion in which the major portion of opening 170 is formed. The opening includes an upwardly extending slot 172 to receive spine 102. Ear 166 further includes an upper, generally planar portion 176 inclined therefrom at an acute angle, as can be seen in FIG. 15. A generally triangular gusset or reinforcing plate 180 is secured at its lower edge 182 by welding to the upper wall 162 of enclosure 120. Plate 180 is welded at its forward edge 184 to the rear surface of ear 166 at its tilted, upper portion 176.

It has been found through periods of extensive testing and continuous use, that the above-described reinforcing plates in combination with the reinforcing spines provide a durable construction for releasably mating the mounting sockets and support arms together. Further, the combination of the mounting socket and support arm described above permits a relatively simple mounting of the support assembly to the front loader vehicle in a manner which is economical even for repeated mounting and demounting of the support assembly several times a day, on routine daily basis.

Referring to FIG. 17, and additionally to FIGS. 15 and 16, a safety or keeper pin 171 can be provided to prevent the support arm 32 from becoming disengaged with the mounting socket 34. Referring to FIG. 14, the keeper pin 171 is received in registered apertures 173 formed in the sidewalls of mounting socket 34 and the apertures 175 formed adjacent the free ends of support arms 32. In the preferred embodiment, the keeper pin 173 is tethered to the support arm by a flexible cable 177 secured to the reinforcing corner plate 154 by a bolt attachment 179. It is contemplated in the preferred embodiment that the registration of apertures 173, 175 be relied upon to indicate the full mated insertion of the support arms within the mounting sockets, with insertion of the keeper pin being virtually impossible unless such registration is achieved.

Referring now to FIGS. 22–25, a more preferred embodiment of the mounting socket according to principles of the present invention is generally indicated at 234. The mounting socket 234 includes a generally tubular enclosure 320, similar to the enclosure 120 described above with reference to FIGS. 14-18. Enclosure 320 defines an internal passageway 322 dimensioned to receive support arm 32 (see FIG. 25). As with the enclosure 120, the enclosure 320 of mounting socket 234 is also welded to the upper end of bucket 16, and includes a plurality of reinforcing plates so as to withstand vertical stresses and impulses as the vehicle, loaded with a tarp, traverses the irregular surface of a landfill site. A five-sided polygon reinforcing plate 330, having upper edges 332, 333 is located at the outer side wall of enclosure 320 and is secured thereto and to the top of bucket 16 by continuous welding along its outer edges. As before, the reinforcing plate 330 preferably comprises an integral portion of bucket 16 and provides a major point of securement for the enclosure 320 thereto.

A second, generally rectangular plate 340 extends from the upper edge 333 of plate 330 and is disposed at an angle of approximately 70 from the front face 321 of enclosure 320. Plate 340 is also continuously welded along its outer edges to tubular enclosure 320.

Referring to FIG. 24, generally rectangular reinforcing plates 341, 346 are welded to the inside side wall of enclosure 320. The plates 346,341 are welded to the upper surface of bucket 16 and provide secure retention of the inside portion of socket 234.

The upper rear corners of tubular enclosure 320 are reinforced by angle plates 354, which are generally L-shaped in cross-section. The corner plates 354 are continuously welded at their outer edges to the corners of tubular enclosure 320 to provide a significant reinforcement against upwardly directed pressures imparted to the enclosure by the free end of support bar 32, particularly when the vehicle is loaded with a tarp being transported from one location to another.

One important feature of mounting socket 234 is the substitution of a reinforcing channel 360 for the plate 166 described above and illustrated in FIG. 18. The support channel 360 is rectangular and preferably has a square cross-sectional configuration. The reinforcing channel 360 preferably has a smaller cross-sectional size than the tubular enclosure 320. In the preferred embodiment, the tubular enclosure 320 is approximately six inches square in cross-section, whereas the reinforcing channel 360 is approximately three inches square in cross-section.

With reference to FIG. 25, it can be seen that the reinforcing channel 360 includes an upper wall 362 inner and outer side walls 364,366, respectively. The lower edges of side walls 364,366 are preferably continuously welded to the upper wall of tubular enclosure 320. The open bottom portion of support channel 360 provides communication with a spine-receiving slot 359 formed in the upper wall of tubular enclosure 320. As can be seen in FIG. 22, the tubular channel 360 is preferably closed at its rearward end by a solid wall 370.

Referring especially to FIG. 25, the slot 359 in the upper wall of enclosure 320 receives the upwardly extending reinforcing spine 102 of support bar 32, thus permitting telescopic insertion of the support bar within the mounting socket 234. When mated in the mounting socket, the reinforcing spine 102 is received within the interior of reinforcing channel 360. Unlike the previously described embodiment of mounting socket 34, the preferred mounting socket 234 described herein features a pin end-receiving aperture 374 formed in reinforcing spine 102, as opposed to being formed in the body of support bar 32. Cooperating apertures 376 are formed in the side walls 364, 366 of reinforcing channel 360 The apertures in the reinforcing channel 360 are positioned so as to be aligned in registry with the aperture 374 in reinforcing spine 102, when the support bar is fully mated in the mounting socket. A safety or keeper pin 380 is attached by a chain or cable 382 to the reinforcing corner 354. The keeper pin 380 is telescopically inserted in apertures 374,376 in the manner illustrated in FIGS. 23-25, in order to ensure that the support bar will not become disengaged from the mounting socket throughout a workday operation.

Although the reinforcing channel described above is generally three-sided, having a generally U-shaped cross section, the present invention also contemplates the use of a four-sided fully enclosed rectangular tube which is slotted on its bottom wall in a manner similar to that of slot 359 so as to receive reinforcing spine 102 therein. One advantage of a square tube is the added strength and increased surface area for welded joinder with the tubular enclosure 320.

As can be seen from the above, mounting socket 234 is similar in many respects to the aforementioned mounting socket 34 illustrated above in FIGS. 14-18. As has already been mentioned, one advantage of the mounting socket 234 is the increased strength provided by the reinforcing channel 360 which can be increased even further by use of a square rectangular tube in place of the reinforcing channel, if desired. Another advantage of the mounting socket 234 is the "clean" or smooth outer profile which is important in sanitary landfill and other operations. Also, the replacement of the reinforcing plate 166 and the gusset or fish plate 180 illustrated in FIG. 14, for example, reduces the risk of unintentional engagement or snagging since upstanding members located at the forward end of the vehicle, are not present in the embodiment of FIGS. 22-25.

The preferred mounting of the tarp to the crossarm will now be explained in greater detail. As will be seen, the tarp mounting provides advantages in allowing for discrepancies in positioning the eyelets along the margins of the tarp, and in providing a simple economical mounting which can be easily repeated several times a day, on routine daily basis. The crossarm 38 includes a plurality of hooks 50 swingingly mounted about the crossarm by connector links 52.

According to one feature of the present invention, the hooks 50 are allowed to swing in lateral directions to account for discrepancies in the spacings between adjacent eyelets of tarp 12. This is an important feature in that a significant number of eyelets are provided at each tarp margin, to provide nearly continuous support along the fifty foot long tarp edges. Further, while eyelets spaced further apart from one another than the spacing between hooks allows easy adjustment by folding the tarp between the eyelets, an eyelet spacing shorter than the hook spacing would effectively preclude the tarp or at least that portion of the tarp from being mounted to the crossarm, with the weight of the tarp being transferred to adjacent hooks in a manner which would significantly increase the stress thereat.

Further, it is important that operators be able to quickly and efficiently mount the tarp ends to the crossarm in a simple manner since that operation is performed at least four times a day. The operation is performed once to mount both ends of the tarp to the crossarm at a tarp storage location, for transport to the land area. The tarp is then demounted at a desired location on the land area, and is subsequently remounted at the start of another business day when it is desired to uncover the land area. Finally, after being mounted again to the crossarm for transport from the land area to a convenient storage location, the tarp is demounted from the crossarm to allow the vehicle to return to the land area to retrieve another tarp, or finally, to allow storage of the crossarm in the manner illustrated in FIG. 13, thereby freeing the front loader vehicle for earth moving operations.

The hooks 50 also provide an advantage in allowing the tarp and particularly the ends thereof, to freely hang at various angles with respect to the crossarm as the flexible crossarm responds to the force of gravity. The angle between the tarp and the crossarm will of course change as the crossarm is raised and lowered and its is generally desirable to allow the tarp to swing about its releasable mountings so as to prevent any buildup or amplification of stresses between the hooks and eyelets.

Referring now to FIGS. 19–21, an alternative embodiment of tarp 12 is generally designated by the numeral 200. The tarp 200 includes opposed peripheral edges 202, 204 and a number of intermediate generally parallel seams 206. As with tarp 12, each of the ends 202, 204 and the intermediate seams 206 include a spaced plurality of hook-receiving eyelets 210. The eyelets 210 are preferably colinearly aligned so that each hook engages each end of the tarp as well as the intermediate seams. It is particularly important that swingable hooks 50 be provided to mount the multiply folded tarp 200 to account for any slight misalignment between the eyelets of different seams. It is generally preferable in this regard that the spacing between eyelets be made slightly larger than the spacing between adjacent mounting hooks 50. The arrangement of FIGS. 19–21 is particularly advantageous for lighter weight tarps whose total weight can be accommodated by the utility vehicle used to practice the method according to principles of the present invention. With the arrangement of FIGS. 19–21, tarps can be elongated in the direction of travel of the vehicle with the increased length of the tarp being stored with additional folds, each fold being hangingly suspended from the hooks 50.

As mentioned above, it is generally preferred that when a plurality of tarps are employed to cover a relatively large land area, that the edges of the tarps be arranged in an overlapping manner, resembling the shingling of a roof, so as to continuously cover the land area. It has been found in practicing the present invention, that the overlapping arrangement of tarps, as illustrated FIG. 21, is particularly useful for protecting relatively large sloping areas against water intrusion. This is a commercially important feature for sanitary landfill sites, and especially for such sites which deposit landfill so as to form a progression of overlying downwardly sloping surfaces during the course of each business day. It is important that adequate cover for these slopes be provided, and the methods and apparatus according to principles of the present invention have been found very advantageous in this regard. As pointed out above, the present invention is particularly suited for use with sanitary landfill operations, and allow a landfill site to be covered and uncovered daily, in a fraction of the time heretofore required to apply a daily soil cover.

It is thought that the invention and many of its attendant advantages will be understood from the foregoing description and it will be apparent that various changes may be made in form, construction and arrangement thereof without departing from the spirit and scope of the invention or sacrificing all of its material advantages, the forms hereinbefore described as being merely a preferred or exemplary embodiment thereof.

What is claimed is:

1. Apparatus for suspending a flexible cover a spaced distance from a front loader bucket of an earth-moving vehicle, comprising:
   a cross member having opposed free ends and an intermediate portion;
   a pair of spaced apart rearwardly extending extension arms joined at one end to the intermediate portion of the cross member and having second, opposed free ends;
   means at the second ends of the extension arms for mounting the extension arms to the front loader bucket;
   a lateral member extending between the extension arms adjacent the free ends thereof;
   upstanding reinforcing spines upwardly extending from the extension arms and having free ends spaced from the free ends of the extension arms; and
   means for releasably supporting the flexible cover at a series of spaced locations along said cross member.

2. The apparatus of claim 1 further comprising:
   a pair of spaced apart generally parallel tubular enclosures for attachment to the bucket having forward arm-receiving openings;
   a pair of ears upstanding from forward ends of the enclosures defining a spine-receiving aperture; and
   the free ends of said extension arms dimensioned for reception in the enclosures with the spines received in the ears so that the support arms receive cantilever support from the enclosure and the ears as the bucket is raised and lowered.

3. The apparatus of claim 2 further comprising an outwardly directed ledge extending from a forward edge of the bucket, so as to lie generally between the tubular enclosures, said lateral member cooperating with the extension arms to rest on the ledge as the extension arms receive support from the enclosures and the ears.

4. The apparatus of claim 3 wherein forward ends of the enclosures include a spine-receiving slot so as to receive the free ends of the reinforcing spines, said slot comprising said spine-receiving aperture.

5. The apparatus of claim 1 further comprising upstanding reinforcing spines upwardly extending from the intermediate portion of the cross member to the free ends thereof so as to provide cantilever support therefor.

6. The apparatus of claim 5 further comprising reinforcing spines downwardly extending from the bottom of the cross member, between the intermediate portion and, the free ends thereof.

7. The apparatus of claim 1 wherein the means for releasably mounting the flexible cover to the cross member comprises a plurality of spaced apart hooks mounted to the cross member for engaging a flexible cover defining a corresponding plurality of spaced apart hook-receiving apertures.

8. The apparatus of claim 1 further comprising:
   a pair of spaced apart generally parallel tubular enclosures for attachment to the bucket, having forward arm-receiving openings and spine-receiving slots in upper wall portions of the enclosure;

a pair of generally tubular reinforcing enclosures mounted atop the arm-receiving enclosures and having slot means at a lower portion thereof communicating with the slot means of the arm-receiving enclosures so as to form a common spine-receiving passageway therewith; and the free ends of said extension arms dimensioned so that the spines thereof are received in the spine-receiving enclosures and the arms thereof are received in the arm-receiving enclosures so as to receive support therefrom as the bucket is raised and lowered.

9. Apparatus for suspending a flexible cover a spaced distance from a front loader bucket of an earth-moving vehicle, comprising:

a cross member having opposed free ends and an intermediate portion;

a pair of spaced apart rearwardly extending extension arms joined at one end to the intermediate portion of the cross member and having second, opposed free ends;

a lateral member extending between the extension arms adjacent the free ends thereof;

upstanding reinforcing spines upwardly extending from the extension arms and having free ends spaced from the free ends of the extension arms;

means for releasably supporting the flexible cover at a series of spaced locations along said cross member;

a pair of spaced apart generally parallel tubular enclosures for attachment to the bucket, having forward arm-receiving openings and a spine-receiving slot so as to receive the free ends of the reinforcing spines;

a pair of ears upstanding from forward ends of the enclosures defining a spine-receiving aperture; and the free ends of said extension arms dimensioned for reception in the enclosures with the spines received in the ears and the enclosure slots so that the support arms receive cantilever support from the enclosures and the ears as the bucket is raised and lowered.

10. Apparatus for suspending a flexible cover from a bucket mounted at the end of a pivotable arm of an earth-moving vehicle, the bucket having opposed sides, the apparatus comprising:

a cross member having opposed free ends and an intermediate portion;

a pair of spaced apart mounting plates at the intermediate portion of the cross member and upstanding thereabove to receive a portion of the bucket with the mounting plates overlying opposed sides of the bucket, said mounting plates each defining a plurality of apertures therein for receiving locking pins extending to the bucket sides;

locking pins extending through the mounting plate apertures to the bucket sides for mounting the cross member to the bucket so as to maintain the cross member generally parallel to the ground as the pivotable arm is pivoted toward and away from the ground; and a plurality of swingably mounted hook means carried by the cross member for releasably supporting the flexible cover at a series of spaced locations along an edge of the flexible cover, whereby the hook means adjust for different spacings along the flexible cover edge and provide continuous lifting support for the flexible cover edge as the flexible cover is raised and lowered by said cross member as the pivotable arm is pivoted toward and away from the ground.

11. Apparatus for suspending of flexible cover a spaced distance from a front loader bucket of an earth-moving vehicle comprising:

a cross member having opposed free ends and an intermediate portion;

a pair of spaced apart rearwardly extending extension arms joined at one end to the intermediate portion of the cross member and having second, opposed free ends;

a lateral member extending between the extension arms adjacent the free ends thereof;

upstanding reinforcing spines upwardly extending from the extension arms and having free ends spaced from the free ends of the extension arms;

a pair of spaced apart generally parallel tubular enclosures for attachment to the bucket having forward arm-receiving openings;

a pair of ears upstanding from forward ends of the enclosures defining a spine-receiving aperture; and the free ends of said extension arms dimensioned for reception in the enclosures with the spines received in the ears so that the support arms receive cantilever support from the enclosure and the ears as the bucket is raised and lowered;

means for releasably supporting the flexible cover at a series of spaced locations along said cross member.

a pair of spaced apart generally parallel tubular enclosures for attachment to the bucket having forward arm-receiving openings;

a pair of ears upstanding from forward ends of the enclosures defining a spine-receiving aperture; and the free ends of said extension arms dimensioned for reception in the enclosures with the spines received in the ears so that the support arms receive cantilever support from the enclosure and the ears as the bucket is raised and lowered.

12. Apparatus for suspending of flexible cover a spaced distance from a front loader bucket of an earth-moving vehicle, comprising:

a cross member having opposed free ends and an intermediate portion;

a pair of spaced apart rearwardly extending extension arms joined at one end to the intermediate portion of the cross member and having second, opposed free ends;

a lateral member extending between the extension arms adjacent the free ends thereof;

upstanding reinforcing spines upwardly extending from the extension arms and having free ends spaced from the free ends of the extension arms;

means for releasably supporting the flexible cover at a series of spaced locations along said cross member; a pair of spaced aprat generally parallel tubular enclosures for attachment to the bucket, having forward arm-receiving openings and spine-receiving slots in upper wall portions of the enclosure;

a pair of generally tubular reinforcing enclosures mounted atop the arm-receiving enclosures and having slot means at a lower portion thereof communicating with the slot means of the arm-receiving enclosures so as to form a common spine-receiving passageway therewith; and the free ends of said extension arms dimensioned so that the spines thereof are received in the spine-receiving enclosures and the arms thereof are received in the arm-receiving enclosures so as to receive support therefrom as the bucket is raised and lowered.

* * * * *